(12) United States Patent
O'Connell

(10) Patent No.: US 7,343,942 B2
(45) Date of Patent: Mar. 18, 2008

(54) FUEL TANK FILLER NECK AND METHOD OF MANUFACTURING SAME

(75) Inventor: Patrick R. O'Connell, Rochester Hills, MI (US)

(73) Assignee: Shelby Enterprises, Inc., Romeo, MI (US)

( * ) Notice: Subject to any disclaimer, the term of this patent is extended or adjusted under 35 U.S.C. 154(b) by 0 days.

(21) Appl. No.: 10/615,485

(22) Filed: Jul. 8, 2003

(65) Prior Publication Data

US 2006/0065325 A1    Mar. 30, 2006

Related U.S. Application Data

(63) Continuation of application No. 09/998,113, filed on Nov. 30, 2001, now Pat. No. 6,588,459, which is a continuation-in-part of application No. 09/454,103, filed on Dec. 3, 1999, now Pat. No. 6,330,893.

(51) Int. Cl.
*B65B 1/04* (2006.01)
(52) U.S. Cl. .................. 141/46; 141/286; 220/86.2
(58) Field of Classification Search .............. 141/286, 141/301, 302, 46, 59, 285; 220/86.2
See application file for complete search history.

(56) References Cited

U.S. PATENT DOCUMENTS

| | | | |
|---|---|---|---|
| 2,319,567 A | 5/1943 | Vegell | |
| 2,336,430 A | 12/1943 | Wery | |
| 3,044,270 A | 7/1962 | Biever | |
| 3,180,376 A | 4/1965 | Sanborn | |
| 3,187,936 A | 6/1965 | Downing | |
| 3,602,030 A | 8/1971 | Nado et al. | |
| 3,979,010 A | 9/1976 | Fiedler et al. | |
| 4,034,784 A | 7/1977 | Ball et al. | |
| 4,195,673 A | 4/1980 | Johnston et al. | |
| 4,204,563 A | 5/1980 | Pyle | |

(Continued)

FOREIGN PATENT DOCUMENTS

DE      24 52 248      5/1975

(Continued)

OTHER PUBLICATIONS

Carbon steel tubes for machine structural purposes; Japanese Industrial Standard; JIS G 3445; 2004.

(Continued)

*Primary Examiner*—Steven O. Douglas
(74) *Attorney, Agent, or Firm*—Harness, Dickey & Pierce, P.L.C.

(57) ABSTRACT

A method of forming a gas tank filler neck includes configuring at least a portion of a seamless tubular member to induce a swirl to passing fuel for venting vapors from the gas tank during fuel filling. The configuration may include deep drawing a seamless funnel member, forming a relatively large inlet at one end thereof, and forming a relatively small outlet at the opposite end thereof, the inlet having an axis offset from the axis of the outlet. A filler neck includes a seamless funnel member defining a relatively large inlet opening and relatively small outlet opening, the position of the inlet opening relative the outlet opening inducing a swirl to the fuel being supplied.

27 Claims, 4 Drawing Sheets

U.S. PATENT DOCUMENTS

| | | |
|---|---|---|
| 4,234,098 A | 11/1980 | Miller et al. |
| 4,386,514 A | 6/1983 | Herten |
| 4,450,880 A | 5/1984 | Scheurenbrand |
| 4,462,620 A | 7/1984 | Bambenek et al. |
| 4,632,270 A | 12/1986 | Sasaki et al. |
| 4,635,813 A | 1/1987 | Peickert |
| 4,782,974 A | 11/1988 | Elkayam |
| 5,056,570 A | 10/1991 | Harris et al. |
| 5,271,438 A | 12/1993 | Griffin et al. |
| 5,309,961 A | 5/1994 | Franke et al. |
| 5,360,040 A | 11/1994 | Thorn et al. |
| 5,385,179 A | 1/1995 | Bates et al. |
| 5,415,316 A | 5/1995 | Pemberton et al. |
| 5,507,324 A | 4/1996 | Whitley, II et al. |
| 5,590,806 A | 1/1997 | Green et al. |
| 5,673,738 A | 10/1997 | Spaulding |
| D392,020 S | 3/1998 | Fairles |
| 5,735,322 A | 4/1998 | Palvolgyi |
| 5,791,387 A | 8/1998 | Palvolgyi |
| 5,860,460 A | 1/1999 | Hidano et al. |
| 6,289,945 B1 | 9/2001 | Haboush, II |
| 6,336,482 B1 | 1/2002 | Cunkle et al. |
| 6,405,767 B1 | 6/2002 | Marsala et al. |
| 6,585,015 B2 | 7/2003 | Hughes |
| 2003/0089424 A1 | 5/2003 | Gabbey et al. |

FOREIGN PATENT DOCUMENTS

| | | |
|---|---|---|
| JP | 58-194627 | 11/1983 |
| JP | 60-156964 | 8/1985 |
| JP | 61-125827 | 7/1986 |
| JP | 10-119595 | 5/1998 |

OTHER PUBLICATIONS

Carbon steel tubes for machine structural purposes; Japanese Industrial Standard; JIS G 3445; 1988.

JIS, Carbon Steel Tubes for Machine Structural Purposes, JIS G 3445-1977, Japanese Industrial Standards Committee, Revised Aug. 1, 1977, 11 Pages and Affidavit of Accuracy; Japanese Text Attached of JIS G 3445-1977, 11 Pages.

Japanese Industrial Standard, Carbon Steel Tubes for Machine Structural Purposes, JIS G 3445-1983, Japanese Standards Association, Revised 7, 1988, 16 Pages; Japanese Text Attached of G3445-1983, Edition 1, 5 Pages.

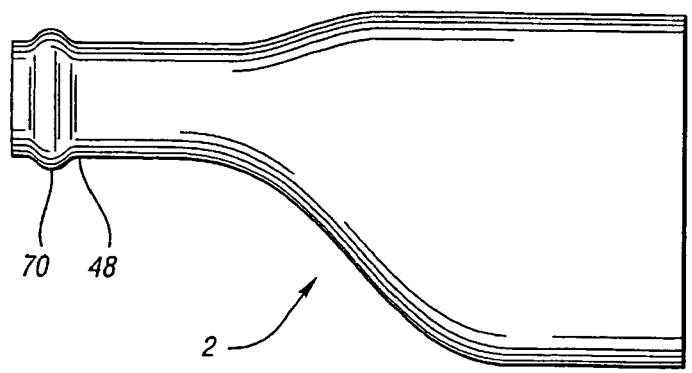
Fig. 6
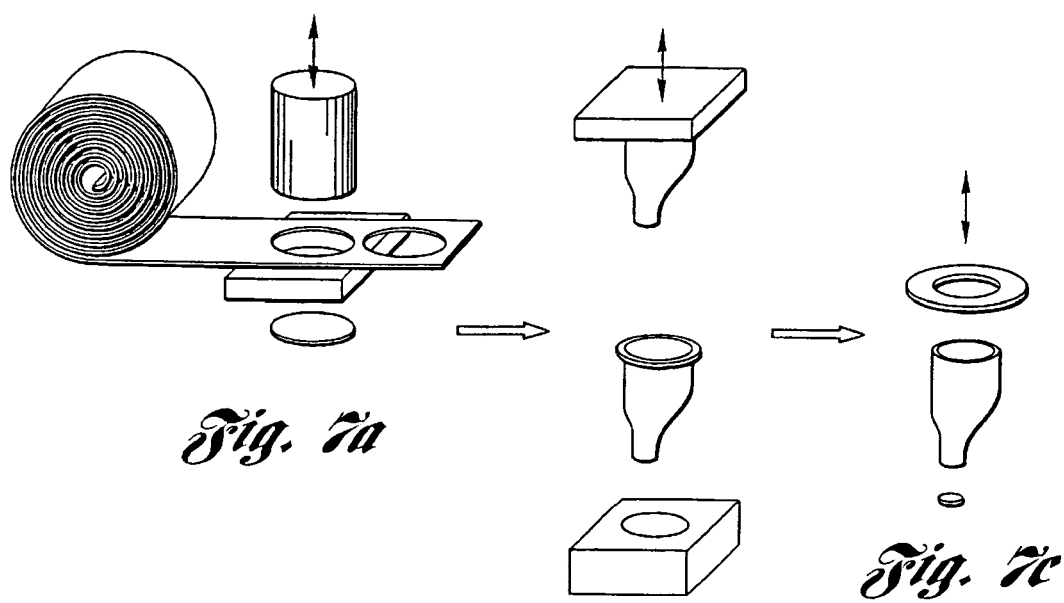
Fig. 7a
Fig. 7b
Fig. 7c

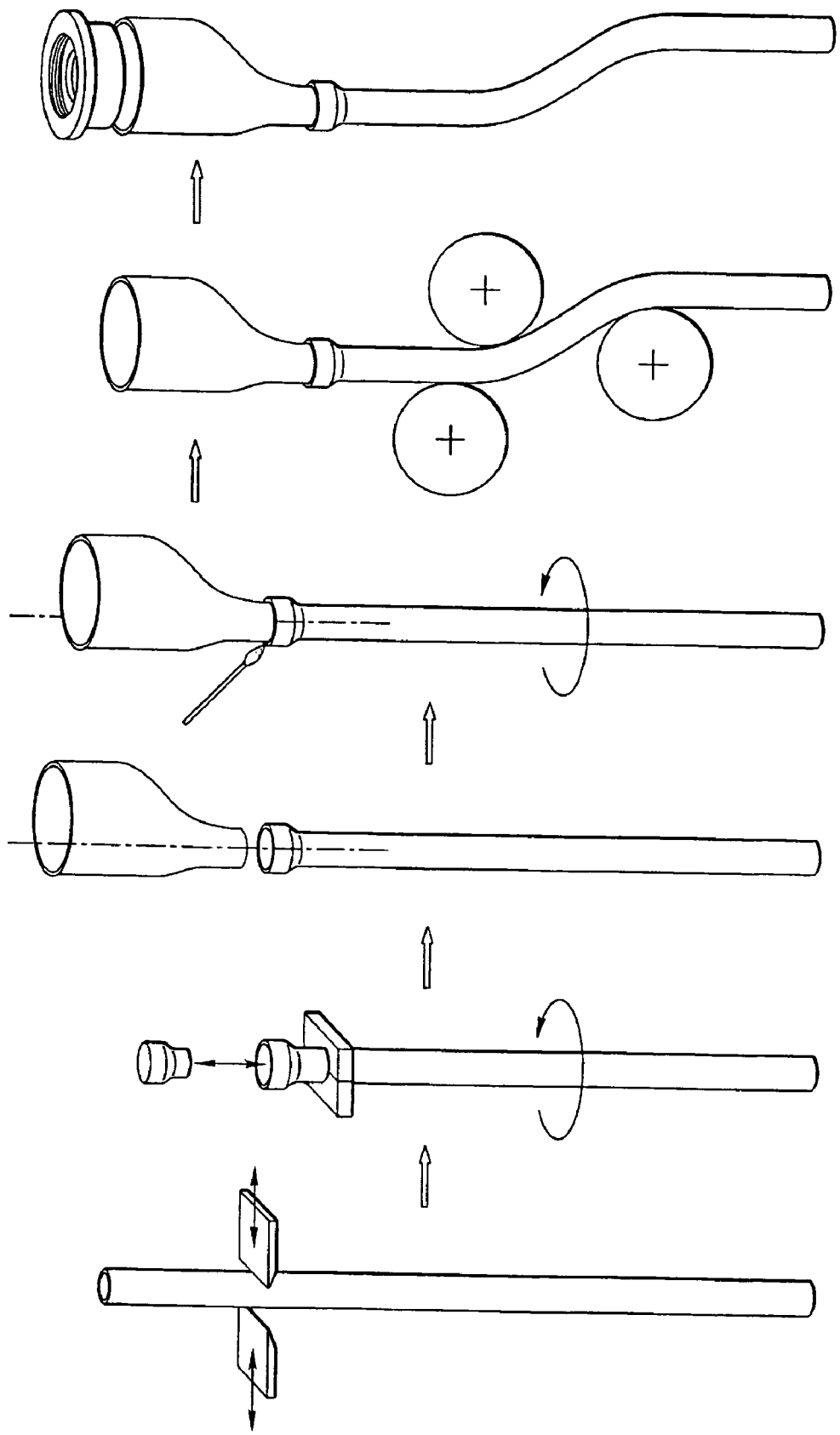

FUEL TANK FILLER NECK AND METHOD OF MANUFACTURING SAME

CROSS-REFERENCE TO RELATED APPLICATIONS

This application is a continuation of U.S. patent application Ser. No. 09/998,113 filed on Nov. 30, 2001 (now U.S. Pat. No. 6,588,459), which is a continuation-in-part of U.S. patent application Ser. No. 09/454,103 filed on Dec. 3, 1999 (now U.S. Pat. No. 6,330,893). The disclosures of the above applications are incorporated herein by reference.

FIELD OF THE INVENTION

The present invention relates to the fuel tank filler neck connected to the gas tank of an automobile.

BACKGROUND OF THE INVENTION

Gas tank fuel systems with reduced gasoline vapor loss are becoming increasingly important in the automobile industry to reduce needless loss of fuel. The typical solution to this problem has been to reduce the diameter of at least a section of the fuel tank filler neck. Though this approach has been somewhat successful, it is limited because as the diameter of the filler neck is decreased, the resistance to flow of the gasoline is increased. The increased resistance causes the fill neck to become filled during vehicle refueling thereby blocking release of any pressure buildup and causing the fuel nozzle to shut off prematurely before the fuel tank is full. Another consideration in preventing the loss of fuel, is the permeability of the materials from which the fuel tank system is made. Fuel vapors escape by diffusing through the various types of mild steels of which components of fuel tank systems are typically made. This fuel escape is particularly apparent after the mild steel components have corroded to any degree.

Another disadvantage of the current methods of reducing gasoline vapor losses is that typically the end of the gas line filler neck is flared out in order to provide a sufficient diameter to accept the gas nozzle during refueling. These filler necks are often made by a process of repeated reductions and expansions of a seamed welded tube. Accordingly, there is an increasing tendency for the integrity of the weld to leak as thinner diameter tubes are utilized.

SUMMARY OF THE INVENTION

The filler neck for receiving a fuel supply nozzle for a motor vehicle fuel tank includes a one-piece seamless funnel member having a tubular body. The funnel member defines in off-set axial relation a relatively large inlet opening adapted for attachment to a receptor for the nozzle and a relatively small necked down outlet opening adapted for attachment to the inlet of an elongated tubular member in communication with the fuel tank. The offset relationship of the inlet and outlet opening induces a swirling motion in the fuel flow as the fuel proceeds towards the fuel tank. The resultant swirl motion of the flowing fuel leaves an opening through which any pressure buildup in the fuel tank may be vented. The spiraling motion of the fuel through the narrow elongated tube member also assists in preventing fuel vapors from escaping during refueling because of an induced suctioning effect that is created by the spiraling motion of the fuel through a narrow cavity.

In another embodiment of the invention, the seamless funnel member is drawn and provided with an attachment portion adjacent to the inlet opening for attaching a gas nozzle receptor to the funnel member. The seamless surface of the filler neck allows for the receptor to protrude into the filler neck and form a seal to the inner surface of the filler neck.

In still another embodiment of the invention, the seamless funnel member is attached to the elongated member inlet by either a braised joint, an adhesive joint, or a resistance welded joint.

In yet another embodiment of the invention, the seamless filler neck is provided with an anti-corrosive coating.

In the preferred embodiment of the invention, the relatively large diameter section forming the inlet opening into which the gas nozzle is positioned and a spaced-apart relatively smaller diameter tubular section forming the outlet opening are in an axially offset relationship. These tubular sections are connected to one another by a tapered section which gradually blends from the large diameter section to the small diameter section. In a refinement of this embodiment, the tapered section intersects the large diameter section at an elliptically-shaped junction which lies in a plane inclined 60-85 degrees from the axis of the tubular sections. In a further refinement of this embodiment, the funnel inlet opening has a diameter $D_1$ and the tubular section has a diameter $D_2$ with a coaxial offset at a distance X where $0.1 \, D_2$ is less than X which is less than $0.3 \, D_2$, and where $D_1$ is at least one and a half times $D_2$. In yet another refinement of this embodiment of the invention, the funnel inlet axial offset is sufficient to achieve fuel swirl during fuel filling.

In another embodiment of the invention, the funnel inlet opening has a diameter $D_1$ and the outlet opening has a diameter $D_2$ where $D_1$ is at least one and a half times $D_2$. In a refinement of this embodiment, $D_2$ is less than 35 mm. In a further refinement of this embodiment, $D_2$ is less than 30 mm.

This invention also includes a method of manufacturing the filler neck for a motor vehicle fuel tank. First, the filler neck is formed by deep-drawing a seamless funnel member having an elongated tubular body with an enlarged inlet at one end and a relatively small outlet at the opposite end. A length of butt-seam tubing is cut to form a tubular member of desired length. An end of the tubular member is telescopically aligned with the outlet of the funnel member to securely join the funnel and tubular members together. The tubular member is bent to a desired shape. A nozzle receptor is attached to the funnel member adjacent the funnel inlet. In a refinement of the method, the configuration is then leak tested to verify the integrity of joining the funnel member to the tubular member and the attachment of the nozzle receptor to the funnel member, and the integrity of the butt-seam joint and the tubular member subsequent to bending. The funnel member is attached to the tubular member by braising, adhesive bonding, or welding. In yet another refinement of the method, a portion of the filler neck is configured to induce a sufficient swirl to create a hollow passage for suctioning fuel vapors to prevent their escape during refueling and to provide a vent passage for any pressure buildup in the fuel tank.

Accordingly, it is an object of the present invention to provide an improved fuel tank filler neck.

Another object of the present invention is to provide an improved fuel tank filler neck that inhibits the escape of gasoline vapors from the fuel tank.

Still another object of the present invention is to provide an improved fuel tank filler neck that is inexpensive to fabricate.

Still another object of the present invention is to provide an improved fuel tank filler neck that vents pressure buildup created in the fuel tank during refueling.

Still another object of the present invention is to provide an improved fuel tank filler neck that does not leak.

Yet another object of the present invention is to provide an improved method for fabricating the fuel tank filler neck of the foregoing objects.

Another more specific object of the invention is a method for forming a filler neck for a motor vehicle fuel tank by deep-drawing a seamless funnel member having an elongated tubular body with an enlarged inlet at one end and a relatively small outlet at the opposite end. A length of butt-seam tubing is cut to form a tubular member of desired length. An end of the tubular member is telescopically aligned with the outlet of the funnel member and securely joining the funnel and tubular members together. The tubular member is bent to a desired shape. A nozzle receptor is attached to the funnel member adjacent the funnel inlet.

Another more specific object in the method of the last mentioned object includes a portion of the filler neck configured to induce a sufficient swirl to create a hollow passage for venting vapors from the gas tank during fuel filling.

In carrying out the above objects and other objects and features of the present invention, a fuel tank filler neck is described in a mounting relationship to the vehicle fuel tank. The fuel tank filler neck and the method for its manufacture provide advantages to an automobile manufacturer by reducing escape of gasoline vapors from the fuel tank, by permitting simple manufacturing of the filler neck, and by reducing attendant costs.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

The present invention will become more fully understood from the detailed description and the accompanying drawings, wherein:

FIG. 6 is a cross sectional view of a hose bead modification of the fuel tank filler neck according to another embodiment of the present invention; and FIGS. 7a-7i are schematic illustrations of the method steps for making the fuel tank filler neck of this invention.

DETAILED DESCRIPTION OF THE PREFERRED EMBODIMENTS

Figure 1:
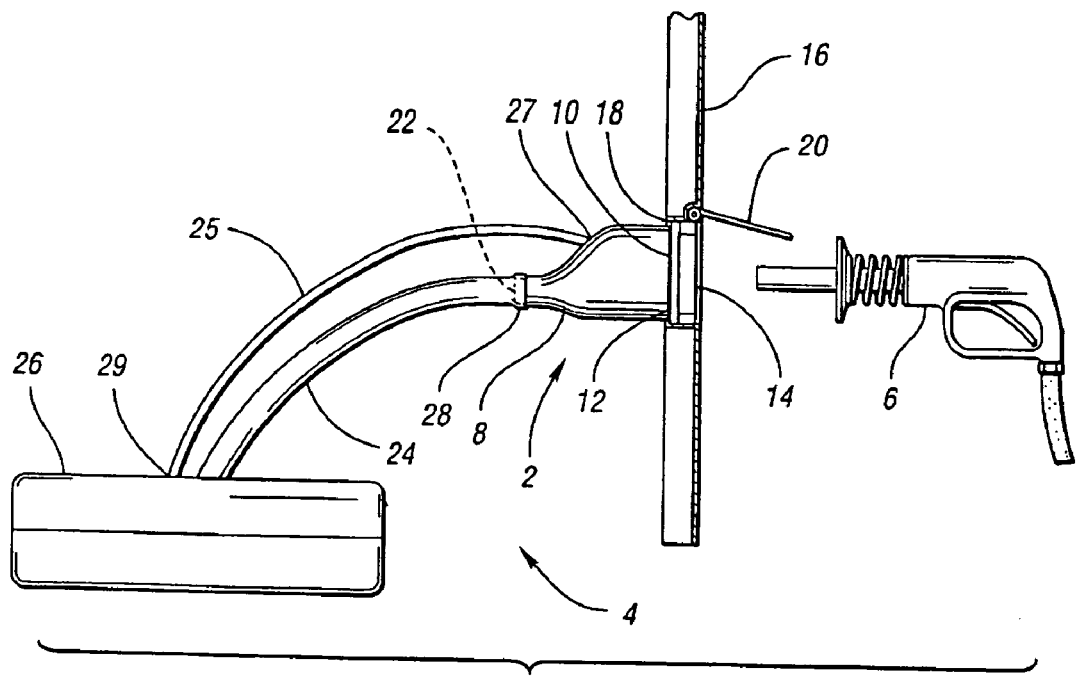
FIG. 1 is a schematic of a fuel tank filler neck incorporated in a automobile fuel tank system.

With reference to FIG. 1 a schematic of an embodiment of fuel tank filler neck 2 incorporated into automobile fuel tank system 4 is provided. Filler neck 2 for receiving fuel nozzle 6 for a motor vehicle fuel tank includes a one-piece funnel member 8 having a tubular body. One piece funnel member 8 may be made of a number of types of metals, suitable materials include but are not limited to cold rolled steel, zinc nickel, zinc galvanized, 304 stainless steel, 409 stainless steel, terne plate, tin plate, nickel plate, galvaneal, and aluminum. Funnel member 8 may also be made from injection molded plastics. Suitable injection molded plastics include, but are not limited to Acetal (25% glass fiber), PPH (40% glass fiber), Nylon 66 (33% glass fiber), Liquid Crystal Polymer (50% glass fiber) and Nylon 66 (60% glass ceramic fiber). The various grades of stainless steel are more desirable in that such materials are more efficient in preventing gasoline vapors from escaping into the environment.

One end of funnel member 8 is defined by inlet opening 10 which is attached to nozzle receptor 12. Gas cap 14 screws directly into nozzle receptor 12. Fuel tank system 4 attaches to automobile body 16 through opening 18. Movable cover 20 conceals gas cap 14 when the vehicle is not being refueled. The other end of funnel member 8 is defined by outlet opening 22 that is attached to elongated tube member 24. Elongated tube member 24 attaches to fuel tank 26.

During refueling gas cap 14 is removed and gas nozzle 6 is inserted into nozzle receptor 12. Fuel flows out of gas nozzle 6 into funnel member 8. Funnel member 8 induces a swirling motion in the fuel as the fuel proceeds to flow into elongated tube member 24. The swirling motion of the fuel continues as the fuel fills fuel tank 26. The swirling motion of the fuel created by funnel member 8, creates a suctioning effect that prevents fuel vapors from escaping into the atmosphere during refueling. The swirling motion of the fuel also creates a central void that allows any pressure buildups created during refueling to vent, thereby preventing premature shutoff of the fuel nozzle. Vent tube 25 connects to funnel member 8 at funnel vent hole 27 and to fuel tank 26 at fuel tank hole 29. Vent tube 27 allows displaced vapors in fuel tank 26 to be vented during refueling. The venting configuration defined by vent tube 27 may be replaced by a system that recirculates the fuel vapor. Such system are known to individuals skilled in the art.

Figure 2:
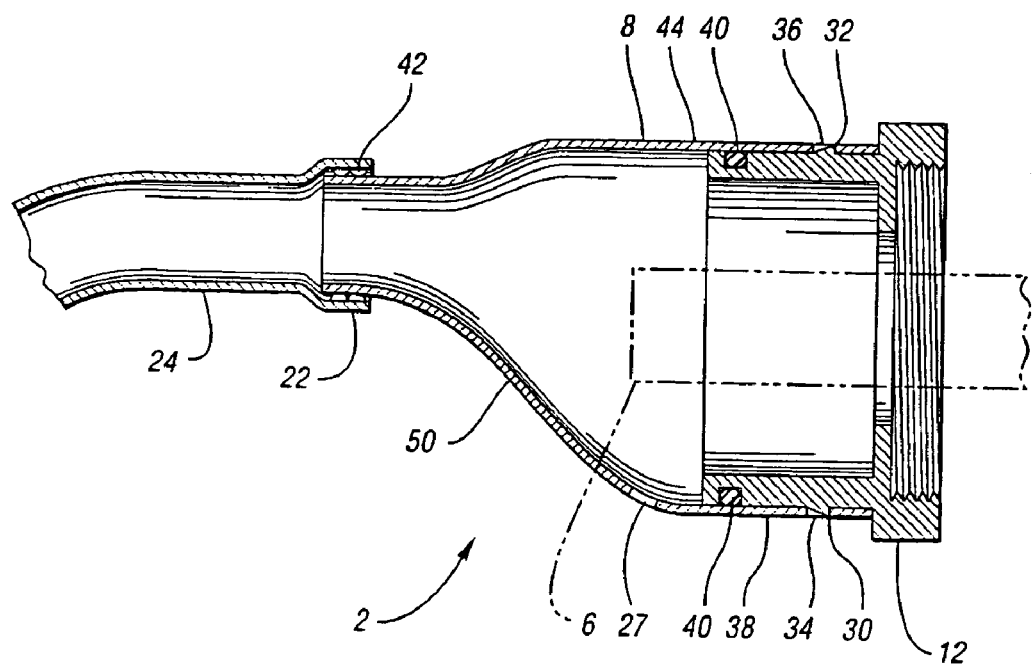
FIG. 2 is a fragmented cross sectional view of the fuel tank filler neck and an attached elongated member in the fuel tank system of FIG. 1 according to one embodiment of the present invention.

With reference to FIGS. 1 and 2, funnel member 8 defines in off-set axial relation a relatively large inlet opening 10 adapted for attachment to a gas nozzle receptor 12 and a relatively small necked down outlet opening 22 adapted for attachment to inlet 28 of elongated tubular member 24. The off-set axial relation between the inlet opening 10 and outlet opening 22 causes fuel emerging from gas nozzle 6 to impinge on side 50 of funnel member 8 and thereby causes fuel to spiral as the fuel proceeds forward to elongated tube member 24. Gas cap 14 screws directly into gas nozzle receptor 6. Filler neck 2 may optionally be provided with vent opening 27 for attachment to vent tube 25. Vent opening 27 may either be drilled in funnel member 8 after it drawn or it may be incorporated in the sheet stock before funnel member 8 is drawn.

Funnel member 8 is drawn and is therefore seamless. Funnel member 8 is provided with an cutouts 30, 32 adjacent to inlet opening 10 for attaching the nozzle receptor 6 to funnel member 8. Cutouts 30, 32 allow nozzle receptor 6 to snap into position via wings 34, 36 that protrude out of nozzle receptor 6. Because funnel member 8 is seamless, insert section 38 of nozzle receptor 6 is able to make intimate contact with funnel member 8 thereby creating a leak-proof seal via O-ring 40. Funnel member 8 is attached to the elongated member inlet 28 by braised joint 42. Optionally, filler neck 2 may be coated with an anti-corrosive coating 44.

Figure 3:
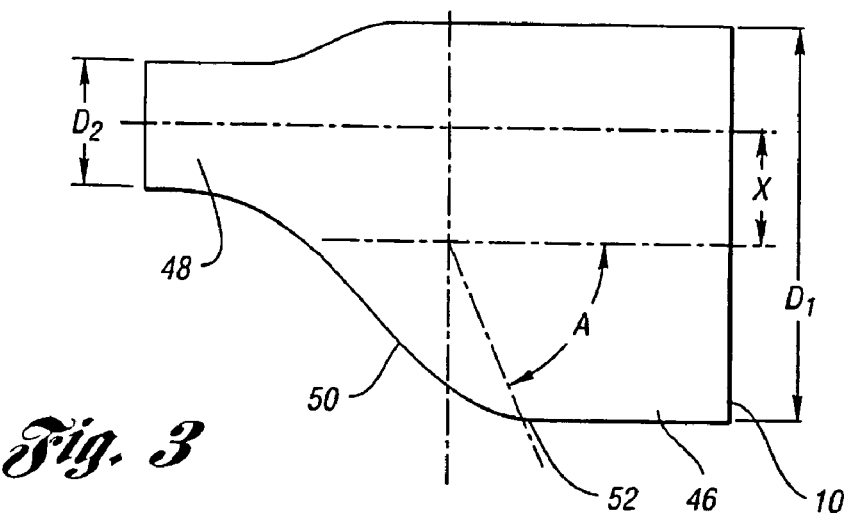
FIG. 3 is a schematic dimensional view of the filler neck as a funnel member according to an embodiment of the present invention.

With reference to FIG. 3, relatively large diameter section 46 forming the inlet opening 10 and the spaced-apart relatively smaller diameter tubular section 48 forming the outlet opening 22 are in an axially offset relationship. The large diameter section 46 and the small diameter tubular section 48 are connected to one another by tapered section 50 which gradually blends from the large diameter section 46 to the small diameter section 48. Tapered section 50 intersects large diameter section 46 at elliptically-shaped junction 52 which lies in a plane inclined at angle A which is 60-85 degrees from the axis of the tubular sections. The funnel inlet opening 10 has a diameter $D_1$ of 60 mm and the tubular section has a diameter $D_2$ of 25 mm with a coaxial offset at a distance X which is 15 mm. This offset axial relationship is sufficient to achieve fuel swirl during fuel filling.

Figure 4:
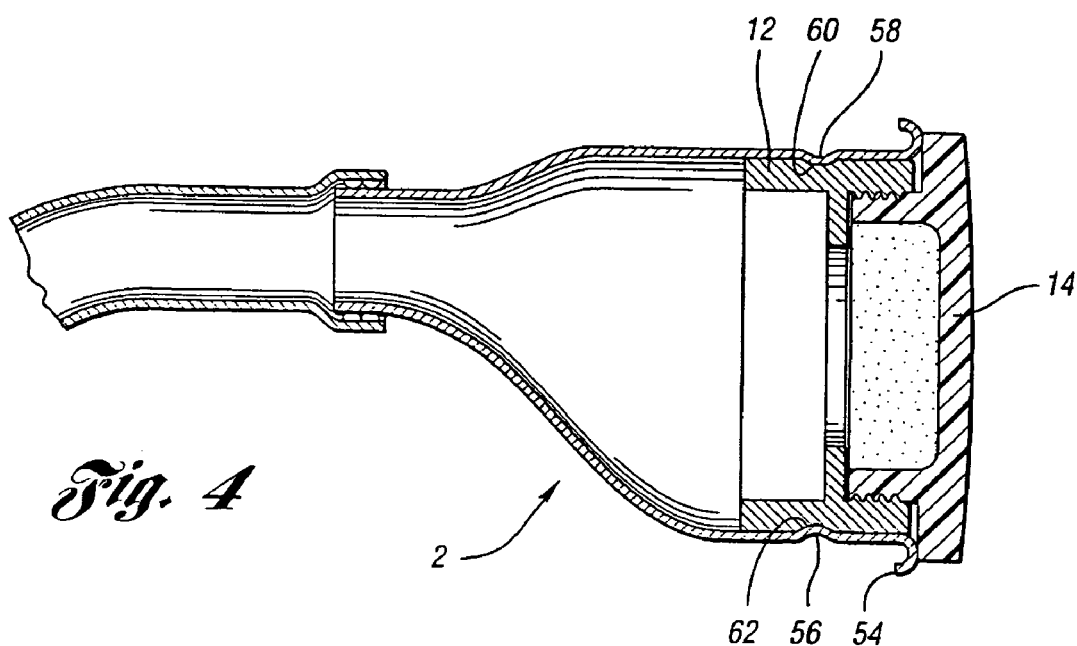
FIG. 4 is a cross sectional view of a rolled over top modification of the fuel tank filler neck according to another embodiment of the present invention.

With reference to FIG. 4, a modification of filler neck 2 is illustrated. Rolled over top 54 is formed at the top of large diameter section 46. In this modification, rolled over top 54 provides a sealing surface onto which gas cap 14 makes a seal. Gas cap 14 screws directly into nozzle receptor 12. Nozzle receptor 12 is held in position by crimps 56, 58 which project into indentations 60, 62 in nozzle receptor 12.

Figure 5:
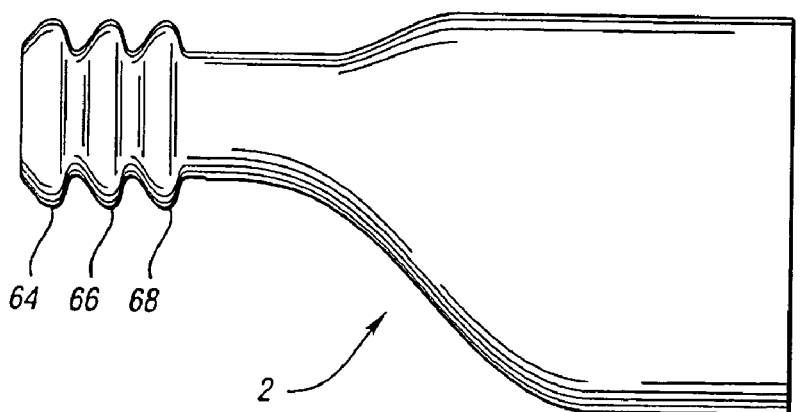
FIG. 5 is a cross sectional view of a barbed end design of the fuel tank filler neck according to another embodiment of the present invention.

With reference to FIG. 5, a modification of filler neck 2 is illustrated. The surface of the smaller diameter tubular section 48 is provided with barbs 64, 66, 68. This modification allows for plastic or rubber tubing to be utilized for the formation of elongated tube member 24.

With reference to FIG. 6, a modification of filler neck 2 is provided. The surface of the smaller diameter tubular section 48 is provided with hose bead 70. This modification allows for plastic or rubber tubing to be utilized for the formation of elongated tube member 24.

The fuel tank filler neck of this invention may be made by a number of processes which includes eyelet/progressive stamping, eyelet stamping, progressive die stamping, transfer die stamping, and hydroforming. If the fuel tank filler neck is made of plastic, injection molding and compression molding are suitable methods for manufacturing the fuel tank filler neck.

The eyelet/progressive stamping method of manufacturing the fuel tank filler neck of this invention will now be described with reference to FIGS. 1, 2, 3 and 7. First, the filler neck 2 for motor vehicle fuel tank system 4 is formed by deep-drawing a seamless funnel member 8 having an elongated tubular body 24 with an enlarged inlet opening 10 at one end and a relatively small outlet opening 22 at the opposite end. A length of butt-seam tubing is cut to form a tubular member 24 of desired length. An end of the tubular member is telescopically aligned with outlet opening 22 of funnel member 8 and securely joins the funnel and tubular members together. Elongated tubular member 24 is bent to a desired shape. Nozzle receptor 12 is attached to funnel member 8 adjacent funnel inlet opening 10. In a refinement of this embodiment, the configuration is then leak tested to verify the integrity of joining funnel member 8 to tubular member 24 and the attachment of nozzle receptor 12 to funnel member 8, and the integrity of the butt-seam joint 42 and the tubular member 24 subsequent to bending. The funnel member 8 is attached to the tubular member 24 by braising, adhesive bonding, or welding. In yet another refinement of this embodiment, a portion of the filler neck 2 is configured to induce a sufficient swirl to create a hollow passage for suctioning fuel vapors into the tank 26 and to allow venting of any pressure buildup during in fuel tank 26 during refueling.

With reference to FIG. 7, schematic illustrations of the method steps for making the fuel tank filler neck of this invention and attaching the elongated tube member are provided. In step 7a, sheet stock is preformed into a circular blank that is drawn into a funnel shape in step 7b. The ends of the funnel shape are next trimmed in step 7c to remove excess stock and thereby form funnel member 8. In step 7d, pipe stock is cut to desired length to form elongated tube member 24. Elongated tube member 24 is then flared at the ends in step 7i in order to provide an attachment mechanism to the funnel member. The elongated tube and funnel member are then aligned in step 7f and brazed together in step 7g. The funnel member and elongated tube combination is then bent in step 7h. Nozzle receptor 12 is then inserted in step 7i.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A filler neck assembly comprising:
    a funnel member having a tubular body defining a larger inlet opening, a smaller outlet opening, and a transition portion disposed between the inlet opening and the outlet opening; and
    a nozzle receptor disposed within the tubular body and operable to position a nozzle relative to the transition portion such that fuel from the nozzle is directed toward the transition portion to induce a swirl to and vent vapors from fuel flowing through the tubular body.

2. The filler neck assembly of claim 1, further comprising a sealing surface formed of the tubular body about the inlet opening.

3. The filler neck assembly of claim 2, wherein the inlet opening is rolled over to create the sealing surface.

4. The filler neck assembly of claim 1, wherein the outlet opening is barbed.

5. The filler neck assembly of claim 1, further comprising a hose bead formed about the outlet opening.

6. The filler neck assembly of claim 1, further comprising a hose, wherein the outlet opening is attached to the hose.

7. The filler neck assembly of claim 6, further comprising a vent hole formed on the tubular body.

8. The filler neck assembly of claim 7, further comprising a vent tube connected to the tubular body about the vent hole.

9. The filler neck assembly of claim 8, further comprising a fuel tank, the vent tube and the hose connecting the tubular body and the fuel tank.

10. The filler neck assembly of claim 1, wherein the nozzle receptor is disposed proximate to the inlet opening.

11. The filler neck assembly of claim 1, further comprising a hose and a fuel tank, the hose connecting the outlet opening and the fuel tank.

12. The filler neck assembly of claim 11, wherein the transition portion includes an elliptically-shaped junction between a first portion of the tubular body including the inlet opening and a second portion of the tubular body includes the outlet opening.

13. The filler neck assembly of claim 12, wherein the elliptically-shaped junction lies on a plane inclined at an angle to an axis of at least one of the inlet opening and outlet opening.

14. The filler neck assembly of claim 1, wherein the inlet opening has a diameter $D_1$, the outlet opening has a diameter $D_2$, and $D_1$ is at least one and a half times $D_2$.

15. The filler neck assembly of claim 1, wherein the funnel member is seamless and is formed from a single piece of material.

16. The filler neck assembly of claim 1, wherein the inlet opening and outlet opening are axially offset.

17. A method of forming a filler neck for a motor vehicle fuel tank comprising:
 forming a funnel member;
 forming a relatively large inlet at one end of the funnel member, the inlet having a first axis;
 forming a relatively small outlet at the opposite end of the funnel member, the outlet having a second axis offset from the first axis;
 configuring a transition portion of the funnel member between the inlet and outlet; and
 forming a nozzle receptor within the funnel member that positions a nozzle relative to the transition portion such that fuel from the nozzle is directed toward the transition portion to induce a swirl to and vent vapors from fuel flowing through the funnel member.

18. The method of claim 17, further comprising:
 cutting a length of tubing to form a hose of desired length; and
 telescopically joining an end of the hose to the outlet of the funnel member.

19. The method of claim 18, further comprising:
 attaching the nozzle receptor to the funnel member adjacent the inlet.

20. The method of claim 17, further comprising rolling over an edge of the inlet to the funnel member.

21. The method of claim 17, further comprising forming a vent hole in the funnel member.

22. The method of claim 21, further comprising connecting a vent tube about the vent hole and in communication with a fuel tank.

23. The method of claim 17, further comprising connecting the funnel member and a fuel tank via a hose.

24. The method of claim 17, further comprising applying an anticorrosive coating to the funnel member.

25. The method of claim 17, wherein the configuring the transition portion includes forming an elliptically shaped junction between a first portion of the funnel member including the inlet and a second portion of the funnel member including the outlet.

26. The method of claim 25, wherein the forming includes forming the elliptically shaped junction on a plane inclined at an angle to an axis of at least one of the inlet and outlet.

27. The method of claim 17, wherein the configuring includes forming the inlet with a diameter $D_1$ and an outlet with a diameter $D_2$, wherein $D_1$ is at least one and one-half times $D_2$.

* * * * *